US012066297B2

(12) United States Patent
Tseng et al.

(10) Patent No.: US 12,066,297 B2
(45) Date of Patent: Aug. 20, 2024

(54) SYSTEMS AND METHODS FOR PERSONALIZED ROUTE PREDICTION

(71) Applicant: Ford Global Technologies, LLC, Dearborn, MI (US)

(72) Inventors: Fling Finn Tseng, Ann Arbor, MI (US); Shiqi Qiu, Canton, MI (US); Dimitar Filev, Novi, MI (US); Johannes Geir Kristinsson, Ann Arbor, MI (US); Nikhil Jamdade, Dearborn, MI (US); Swati Rawat, Mississauga (CA); Kalyani Sonawane, Plymouth, MI (US); Himanshu Verma, Farmington Hills, MI (US); Bhagyashri Katti, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 409 days.

(21) Appl. No.: 17/648,051

(22) Filed: Jan. 14, 2022

(65) Prior Publication Data
US 2023/0228582 A1    Jul. 20, 2023

(51) Int. Cl.
*G01C 21/34* (2006.01)
*G06N 20/00* (2019.01)

(52) U.S. Cl.
CPC ......... *G01C 21/3484* (2013.01); *G06N 20/00* (2019.01); *G01C 21/3492* (2013.01)

(58) Field of Classification Search
CPC ............ G01C 21/3484; G01C 21/3492; G01C 21/3617; G01C 21/20; G06N 20/00; G06N 5/025; G06N 7/01
See application file for complete search history.

(56) References Cited

U.S. PATENT DOCUMENTS 8,478,642 B2    7/2013    Dey et al.
9,803,990 B2    10/2017   Fletcher
(Continued)

OTHER PUBLICATIONS

Francisco Dantas Nobre et al, "Combining Markov model and Prediction by Partial Marching compression technique for route and destination prediction", Elsevier, ScienceDirect, May 7, 2018, 1-12.
(Continued)

*Primary Examiner* — Abby Y Lin
*Assistant Examiner* — Danielle M Jackson
(74) *Attorney, Agent, or Firm* — Emily Drake; Eversheds Sutherland (US) LLP (57) ABSTRACT

Systems and methods for personalized route prediction including receiving, at a first time, first input data associated with a first route; populating a first database with the input data; receiving, at a third time, second input data associated with a second route; comparing the second input data to the first input data included within the first database; determining, based on the comparison, a first cluster including the first data and the second input data or a second cluster including the second input data; populating a second database based on the first cluster or the second cluster; determining, using the first database and at a second time, at least one of: predicted departure data, predicted destination data, and/or predicted route data; and causing, based on the predicted departure data, predicted destination data, and/or predicted route data, to perform an action in association with a vehicle.

14 Claims, 8 Drawing Sheets

(56) References Cited

U.S. PATENT DOCUMENTS

| | | |
|---|---|---|
| 10,746,561 B2 | 8/2020 | Krumm et al. |
| 2012/0209507 A1* | 8/2012 | Serbanescu .......... G01C 21/005 |
| | | 701/410 |
| 2012/0209799 A1* | 8/2012 | Ohama .................. G06N 5/025 |
| | | 706/20 |
| 2015/0275788 A1* | 10/2015 | Dufford ............ B60W 50/0097 |
| | | 701/1 |
| 2016/0109243 A1 | 4/2016 | Tseng et al. |
| 2019/0186939 A1* | 6/2019 | Cox ........................ G06N 20/00 |
| 2020/0249039 A1* | 8/2020 | Lassoued ................ G01C 21/20 |
| 2022/0135071 A1* | 5/2022 | Smith ................... B60W 10/04 |
| | | 701/25 |
| 2024/0077325 A1* | 3/2024 | Lim ......................... G06N 3/08 |

OTHER PUBLICATIONS

Marius Leordeanu et al, "Driven by Vision: Learning Navigation by Visual Localization and Trajectory Prediction", MDPI, Sensors 2021, Jan. 11, 2021, 21, 852, 1-22.

* cited by examiner

SYSTEMS AND METHODS FOR PERSONALIZED ROUTE PREDICTION

BACKGROUND

Personalized and contextually relevant mobility patterns can be used to predict destinations and routes for a given user based on historical data. Most existing solutions require iterative processing of the same data (re-training and epochs in the same training session) and are not capable of producing both simple and more complex, high-precision prediction outputs. Additionally, typical prediction approaches may involve logging large amounts of raw data. This may be inefficient due to the amount of similar data, the raw amount of processing required, and the evolving nature of how users live their lives as needs, preferences, and habits changes over time.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

This disclosure relates to, among other things, systems and methods for personalized route predictions. Particularly, the systems and methods may be used to predict departure points, routes, and destination points for a user using an evolving model that may automatically update based on the user's recent mobility behaviors. The model may only require one-pass processing (for example, pattern extraction) that decouples core anchor patterns and relational states. For example, each full trip data may be decomposed according to date and/or time partitions, starting and/or ending points (e.g., locations extraction and routes, which may be attached with start and/or end pairs and traversed segments). Given this decomposition, trip patterns may be separately learned from different day and/or time partitions. Route learning may also be independently learned for the same start and/or end points at different day/time partitions.

In some embodiments, the system may involve the creation of different databases that may house different types of information relating to the historical route behavior of the user, which, in turn, may be used to create date and time encoded Markov tables and full route databases. A Markov table may be a model that is used to represent changing systems, where future states may not necessarily depend on past states. The system may also provide methods to adjust departure destinations and/or route prediction as context changes, and may provide personal maps prediction as the overlay of most relevant full route predictions. Most existing solutions require iterative processing of the same data (re-training and epochs in the same training session) and are not capable of producing both simple and more complex, high-precision prediction outputs. In contrast, the system described herein encapsulates geospatial and temporal patterns as one mobility-focused statistical evolving model.

Particularly, in some embodiments, the locations extracted from starting and/or ending points may be common and stored in a single common database marked with unique location identifiers. The road segments utilized for the user as a whole may also be stored in a common road segment database. Additionally, a contextual day and/or time database may store relationships between location and destination (e.g., Markov tables associated with different day and/or time). This database may also store full routes as a sequence of road segments and alternative routes (for the same starting and/or ending points) and their relative frequencies as stored separately for different day and/or times.

In some embodiments, the personalized route prediction may involve the use of evolving databases. These evolving databases may include, for example, frequent locations visited by the user, frequent route segments traversed by the user, location transitional patterns, full route alternatives specialized in different times and trips, predefined knowledge graph relationships, as well as learned and derived relationships (and any other relevant data). To ensure the accuracy of the predictions, multiple types of prediction techniques may be used for a single user. The prediction may also involve on-demand retrieval of contextually relevant predictions as context changes occur.

In some embodiments, the prediction data that is produced may be used for various purposes. A first example application of this prediction data may include automatically setting vehicle navigation routes and/or automatically prompting a user as to whether they would like to take a predicted route. A second example application of this prediction data may include automatically adjusting certain features of the vehicle to allow for optimal functionality given the predicted route. For example, if the vehicle is predicted to take an off-road route at a particular time, then the vehicle suspension system may automatically be adjusted to be better suited for off-road driving before that time. As a second example, a particulate filter of the vehicle may be adjusted to adjust the burn off of the filter. Alternatively, the user may be prompted as to whether they would like these changes to be made. A third example application may involve automatically conditioning the cabin of the vehicle prior to a predicted departure time of a user. A fourth example application may involve predictive texting (e.g., an HMI of a vehicle indicating that the user is 15 minutes from a destination). A fifth example application may include predictive diagnostics scheduling.

The systems and methods described herein may provide a number of benefits. A first example benefit may include providing destinations, routes, contextual maps, and/or departure and stop durations as foundational predictive previews. Additionally, different versions of the same predictions may be produced, which may cater to the differing needs of varying users (for example, the predictions may be presented in a simpler, easy-to-understand format, or may be presented in a highly-precise contextual form). The level of specificity in the prediction data can be manipulated for different features and use cases. A third example benefit may include covering both temporal and geospatial patterns to support as use cases that evolve at individual levels. A fourth example benefit may include incorporating segment-level content generated from vehicle systems (e.g., to support vehicle function related learning).

Figure 1:
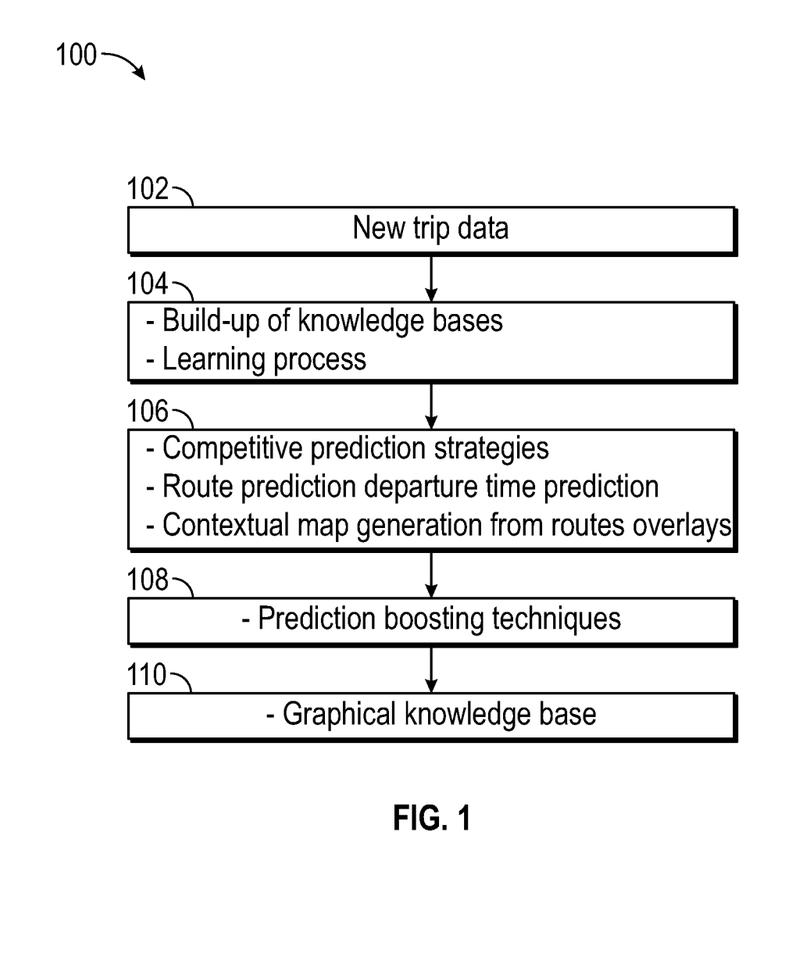
FIG. 1 illustrates an example flow diagram, in accordance with one or more embodiments of the disclosure.

Turning to the figures, FIG. 1 illustrates an example flow diagram 100, the flow diagram 100 depicts high-level operations that may be performed to produce prediction data.

The flow diagram 100 begins with operation 102, which may involve obtaining new trip data. The data may include any data relating to any trips taken by a user, including location data, such as a starting location, a route taken, and a destination location associated with a given trip. The data may also include time data, such as the times at which the user began and completed the trip. The data may also include any other types of data, such as vehicle identifier and/or type, time zone, calendar information (e.g., if it is a workday or an off day), presence of passengers, weather information, window and/or wiper activation signals, road class information (e.g., posted speeds, type of road, etc.), for example. The data may be obtained in any number of manners. For example, the data may be obtained from the vehicle that the user is driving, a mobile device of a user, infrastructure in the vicinity of the route that the user is taking, etc.

Operation 102 is followed by operation 104, which may involve building knowledge bases and performing a learning process. Building the knowledge bases may involve building one or more databases including data associated with any routes that a user (or multiple users) have taken, including any of the aforementioned data, as well as any other types of data. This process of building up the knowledge bases may be further illustrated in FIGS. 2 and 3.

In some embodiments, the learning process may involve the creation and updating of location and edge databases, as well as day and time encoded Markov and day and time trip encoded full route databases. This learning process may be further illustrated in FIGS. 2 and 3 as well.

In some embodiments, the learning process may include a first learning phase and a second learning phase. The first learning phase may involve using evolving clustering and knowledge bases to create one or more location databases and one or more edge databases. A location database may include data such as GPS data relating to frequent parking locations, unique identifiers, visit frequency, discovered and last use date, and/or average stop durations, as well as any other types of data. An edge database may include supporting GPS points, unique identifiers, and/or associated trip identifiers. In some cases, the location database(s) and edge database(s) may include only GPS information, and may not include sequential information. Instead, patterns with sequential information may be learned in the day and time encoded Markov and day and time trip encoded full route databases.

The evolving clustering may include at least the following. First, a new observation (for example, data relating to a route taken by a user) may be added as a first entry in the knowledge base as a first cluster. Following this, new data may be compared with existing clusters. If the new data is close to a known entry in the database, then the data may be assigned to the associated existing cluster, and the statistics associated with this cluster may be updated. If the new data is not close to any known entry that already exists in the database, then a new cluster may be created for the new data.

A second learning phase may involve generating and updating the day and time encoded Markov and day and time trip encoded full route databases. A location database may be used that may store recognized frequent starting and/or ending points as location clusters with a centroid, radius and some other stats. The Markov table (2D) matrix may have rows (e.g., starting locations) and columns (e.g., end location/destination). The Markov table may include the relative strength and/or frequencies that indicate that where the driver might be going given the column number (a starting location). When the system picks from a column the top values, they may correspond to top likely destinations. The system then may refer to the location database to determine those top locations.

In some embodiments, not all updates are the same. Relative frequencies and stop durations may include two distinct patterns related to location transitions. For example, relative frequencies may include a count of how many times a user travels from one place to another. This value may be learned competitively. Stop durations may include the time the user spends at a location before moving to the next location For example, the user may move from location A to location B, C and D. Continuing this example, when the person moves from location A to location C, then the following updates may be performed. In terms of the relative frequencies, the value may be increased for the trip from location A to location C. The value may be decreased for the trip from location A to location B and/or location A to location D. In terms of stop duration, the value may be updated for location A to location C. The other values may remain unchanged.

Operation 104 is followed by operation 106, which may involve performing competitive prediction strategies, performing route prediction and/or departure time prediction, and contextual map generation from route overlays.

In some embodiments, the competitive prediction strategies may involve different prediction strategies used to perform route prediction for a given user. That is, multiple prediction strategies may be used, and the results of these prediction strategies may be compared and/or otherwise used in combination to produce higher-quality prediction data. In some embodiments, two prediction strategies may be used (however, any other number and/or combination of prediction strategies may also be used). A first prediction strategy may involve the use of relative frequencies (RF). Relative frequencies may involve viewing possible next events as alternative scenarios. Learning in this manner may involve counting possible next events collectively. At each count, all potential alternatives may be updated. This type of prediction may not change with time and/or duration. This may be based on a classic Markov Process (what happens more frequently in the past is likely to happen again). A second prediction strategy may involve the use of Poisson parameters ($\beta$). This prediction strategy looks at each event independently and characterizes each type of event with one or more parameters. The prediction may change depending on the time and/or duration. This may be a continuous Markov Process, and may be based on a probability of an event to happen. This probably may be defined by $1-e^{-xi/Bi}$, where B may be an average duration between arrivals, and $-x$ may be a time since a last event.

At a high-level, the use of the multiple prediction strategies may be used in conjunction as follows. First, one type of prediction (RF) may be analyzed, followed by analyzing the second type of prediction (β). Next, a weighted sum of the two predictions may be performed. That is, RF and β may be used to obtain probabilities, and a weighted sum of these probabilities may be performed. These weights may be optimized based on factors such as day, time, location, and/or any other factor. Third, the probabilities may be combined through multiplication. To accomplish this, the power provided to the RF-based probability is fixed at 1. The power of the β probability is then manipulated. If smaller than 1, the impact of β will be enhanced because contrast in β will be enhanced. If larger than 1, the impact of β will be reduced because contrast in will be enhanced. Thus, the power may be optimized to acquire a good value. For example, by day and/or time, location or both. As an example, there may be predictions in terms of probabilities (0-1) coming from two different sources (e.g., from RF and from SD's perspective). One way of combining probabilities is to combine them through multiplication. Say we want to combine PA and PB. Pcombined=PA*PB By optimizing the power term of one of either PA or PB we are saying the emphasis of PA and PB can be adjusted and this means that we how PA should be emphasized (against PB) and by how much can be learned. Fourth, fuzzy membership functions may be used to combine information. This may be performed based on Equation 1 presented below, where $RF_{fuzzy}$ may be used to predict destinations.

$$RF_{fuzzy} = \\ RF * e^{-\frac{1}{2}\left(\frac{x-\beta_{mu}}{\beta_{std}}\right)^2} * K \leftarrow \rightarrow RF_{fuzzy} = RF + K*(\beta_{std}/\beta_{mu}) \quad \text{(Equation 1)}$$

The fuzzy membership function allows for information from different sources to be weighted differently. The Fuzzy weighting may be a normalizer using mean and standard deviation. This allows predictions to be made either from the matching day and/or time block (very specific and conditional on day and/or time) or combine the Markov tables from neighboring day and/or time blocks. The fuzzy weights may be used to combine multiple Markov tables generalized from neighbor day and/or time to produce a common sense prediction. This may be done for various reasons For example, at beginning when the system only sees a small amount of data, this allows the system to start to predict even when matching day and/or time block do not have enough data yet. This may also improve understandability of the prediction (one may not want a one and off prediction to come on) and prediction will be more common with similar contexts (day, time and location). These steps may result in competing observations that can adjust themselves to result in better predictions.

In some embodiments, there are different ways to combine predictions from alternative learning strategies. As a first example, using one prediction as a filter for another (look at each prediction outcomes sequentially). As a second example, combining predictions in probability form (weighted some two probability matrices of the same size, optimize the weights). As a third example, combining through multiplication. Optimize the power factor.

In some embodiments, the route prediction and/or destination prediction may involve full or partial predictions based on the data that is obtained. When full, exact data inputs are available (e.g., date, time, start location), then destination data may be obtained by performing a lookup of the day and time encoded Markov database for destinations with probabilities. Additionally, full routes may be obtained through a lookup from day and time and trip-encoded full route database with start location and predicted destination. When only partial inputs are available, neighborhood day and time blocks in a database may be selected as well. When this is the case, the data may need to be discounted using distance or similarity measures (e.g., center data points are afforded greater weight, and neighboring day and time blocks may be afforded smaller weights). Effectively, this expands the database search to ensure a better chance of matching between learned patterns versus data inputs.

Route prediction may also involve full route predictions. By default, the system may produce full route predictions. Once the starting point is specified, the system may first predict the destinations. Given the day and/or time, starting and/or ending points (predicted), the system may then pull out associated full routes. In some cases, these prediction strategies may be performed for full routes and/or contextual maps at key-on of a vehicle (for example, when the vehicle is turned on). In such cases, the prediction strategy may use day, time, and current location as inputs. The prediction strategy may then involve looking up the matching Markov table (day and time) and using the column of the matching start location. The prediction strategy may then involve ranking potential destinations by relative frequency (for example, from the Markov table). For example, a user may be at a location A. The column corresponding to starting location A may have, for example, 10 entries for 10 likely destinations. The ranking of the relative frequency for those 10 values produce a ranking of corresponding locations (relative frequency, without normalization, won't sum to 1). The prediction strategy may then involve normalizing relative frequencies to acquire probabilities for each potential destination. The prediction strategy may then involve using the current user location and predicted destination pair(s). The prediction strategy may then involve looking up potential full routes and relative frequencies. The prediction strategy may then involve multiplying the destination relative frequencies by the route relative frequencies to acquire full route relative frequencies when multiple destinations are looked at together.

Alternatively, expanded day, time, or location data can also be used. This alternative may involve looking up matching Markov tables, aggregating Markov tables by each table's overall sum of relative frequencies, and then using current location and predicted destination pairs as mentioned above.

In some cases, these prediction strategies may be performed for full routes and/or contextual maps when the vehicle is in motion as well. In such cases (for example, post-key-on), the results from the key-on prediction strategies may be used. That is, past-driven segments may be used. The prediction strategies post-key-on may include, among full routes, identifying routes that match the current sequence by at least a certain percentage amount. Matching scores may be propagated to relative frequencies from destinations and routes. The prediction strategies may also involve further expanding and/or relaxing the day, time, and starting location criteria for the prediction strategies for the key-on events. The prediction may be ended if several relaxations do not return quality results. Relaxation may mean that the system may predict from one vs. multiple day and/or time blocks and/or predict assuming starting location is known vs. unknown. When assuming starting location is unknown, columns from the same Markov table may be combined. The combined column may be used to make predictions (the default may be to use one of the columns that matches the starting location).

If predictions are performed with only the matching day/time block, then initially the system may need to wait until the block has learned something. If predictions are performed with an expanded day/time definition, model parameters may first be combined from neighboring data and/or time blocks. More generic knowledge and/or common sense predictions. Some user's usage pattern will benefit from this approach because of the presence of workday, weekday, and/or weekend patterns and that a user may be following similar schedules around the same times.

In some embodiments, another prediction strategy may involve prediction with emphasis on GPS trace (this may involve deemphasizing other contexts). The same purposed procedure can be performed based on day, time, and/or start locations, for example. Marginalized information and/or weighted sums may be performed with discounted inputs (for example, not simple averages). Any remaining information (for example, destination and routes) may be a weighted version with some contexts removed. Weights may be propagated from the discounted input downstream. Potential destinations may be a weighted sum of multiple starting locations (each with its weights from RF $\beta$) and day and time. Potential full route alternatives may then carry propagated weights from discounted inputs such as day and time and start locations. For each full route alternative, the probability can be obtained based on the following. First, compute level of match (LM) between current GPS trace likely route alternatives. Next, a probability of each full route becomes a product of LM and the propagated weight (with some inputs discounted/marginalized). GPS trace may be partial (for example, last mile or 20 segments/variable length). Route alternatives may be calculated with partial GPS trace prior to computing the LM.

People carry out their daily travels with various patterns. For example, a user may always leave home for work around 7:15, leaves work around 3:30-4:30 to pick up a kid by 4:45, shops for groceries average 25-45 minutes, and/or shops in a pharmacy avg. 5-20 minutes. Some travel patterns (arrival or departure) are strongly related to the starting time itself (leave early for work). Some travel patterns are strongly related to the arrival time of the next destination (for example, pick up kids). Some travel patterns are strongly related to whether the tasks at the current location has been completed or not (i.e. grocery/pharmacy) and when it takes place will look from either A or B's perspective. Knowing the above, the system may have the learning mechanism to pick up those patterns. At prediction time, the different prediction strategies allow this learned information to blend/morph differently over time to produce an optimal result. One learning strategy and one prediction strategy may not necessarily work for all scenarios (however, in some cases a single learning strategy may work). Given this, these alternative statistics may be used that consider the same data to let different prediction strategies to be morphed and activated differently through adaptation.

In some embodiments, the departure time predictions may be determined based on one or more of the following alternatives. First, departure time predictions may be determined based on arrival time and stop duration. As aforementioned, the $\beta$ parameter may represent the stop duration at the starting location. This parameter may be used to make a prediction without additional learning. This may be accomplished by looking up the $\beta$ for the top destination and using this value directly. This look-up may be performed in the DT encoded Markov database. This may also be accomplished by looking up multiple $\beta$ values, aggregating them by weights (normalized RFs), and using aggregated beta to predict. If a bound (for example, +/−15-20 minutes) is desired, the spread (for example, standard deviation) may be needed. In that case, the prediction may be defined as $\beta+/-z*\beta_{std}$, where z is usually a predefined constant (which may range from 1-3, for example).

Second, departure time may be predicted directly if the arrival and departure times for a location are stored. A separate model can be built to produce a departure time estimate. The model can be a classifier or regression function.

Third, departure time may be depicted as a difference between a destination arrival time and a travel time. If the arrival times for the locations are stored, a time taken to reach a destination location can be estimated by the following. First, time may be taken to reach the next destination. Second, the relation between the distance and speed (considering predicted traffic to estimate speed). Third, historical data may be used to predict time for travel between a starting location and sending location. A separate model can be built to predict arrival time, and the model can be used to provide a departure time estimate. These alternative departure predictions may also be combined as well, and a confidence value may be assigned to each prediction resulting from each alternative approach.

Operation 106 may be followed by operation 108, which may involve performing prediction boosting techniques. In some embodiments, the prediction boosting techniques may include techniques used to find long-term behaviors, and can combine behaviors across day and time windows and across locations. The prediction performance-boosting may be accomplished through decoding and other techniques. This may involve using key-on probabilities to identify similarities in user travel patterns not involving adjacent days (for example, if a user works and commutes on Sundays and Wednesdays). Particularly, performance may be boosted using at least the following techniques from the same data and/or model obtained. One example technique may include using some information from neighbor day and/or time blocks. Another example technique may include using most common and/or frequently visited locations as a prediction. Put them in place of low probability predictions. These techniques may be applied individually or together. For example, if the system is allowed to put out three predictions, then a top prediction may be made from the matching day/time block only model. Another two may be made from a neighborhood matrix. If there are spaces remaining, the overall frequent locations may be used (home, work, school, gym, etc.). This improves the prediction outputs.

In some embodiments, the methods described herein may allow for precision predictions and common sense predictions. Precision predictions may involve predictions with matching day and/or time block and start location. Such a prediction may not involve borrowing information from neighboring day and/or time blocks or locations. Common sense predictions may involve long-term/stationary Markov probability matrix, combining information from neighboring day and/or time blocks, and/or combining information from different starting locations Operation 108 is followed by operation 110, which involves producing a graphical knowledge base. A graphical knowledge base provides visualizations of produced route data. A graphical knowledge base can be used to provide destination recommendations based on location type, user type, etc. The graphical knowledge base may also provide route recommendations using graph traversal algorithms. Additionally, the graphical knowledge base provides a visually appealing interface to demonstrate to users their route and destinations. Machine learning models like K-NN clustering can be trained on graph embeddings. The graphical knowledge base allows a constantly evolving view of a user's trips. This allows usage of the previously mentioned evolving machine learning algorithm for route or destination clustering. These graphical representations may be illustrated further in FIG. 5.

Furthermore, machine learning (and/or artificial intelligence, neural networks, and/or the like) may be applied to the evolving knowledge databases. A machine learning model can be trained to predict what class a node may belong to. Two nodes may define a road segment. Each road segment may be connected to other road segments from a node. The model can also be used to predict a non-existing node property. The model can also predict what relationship should exist between nodes. The model can also determine the importance of nodes in a network. Finally, different algorithms can be used to find the shortest path between nodes.

Figure 2:
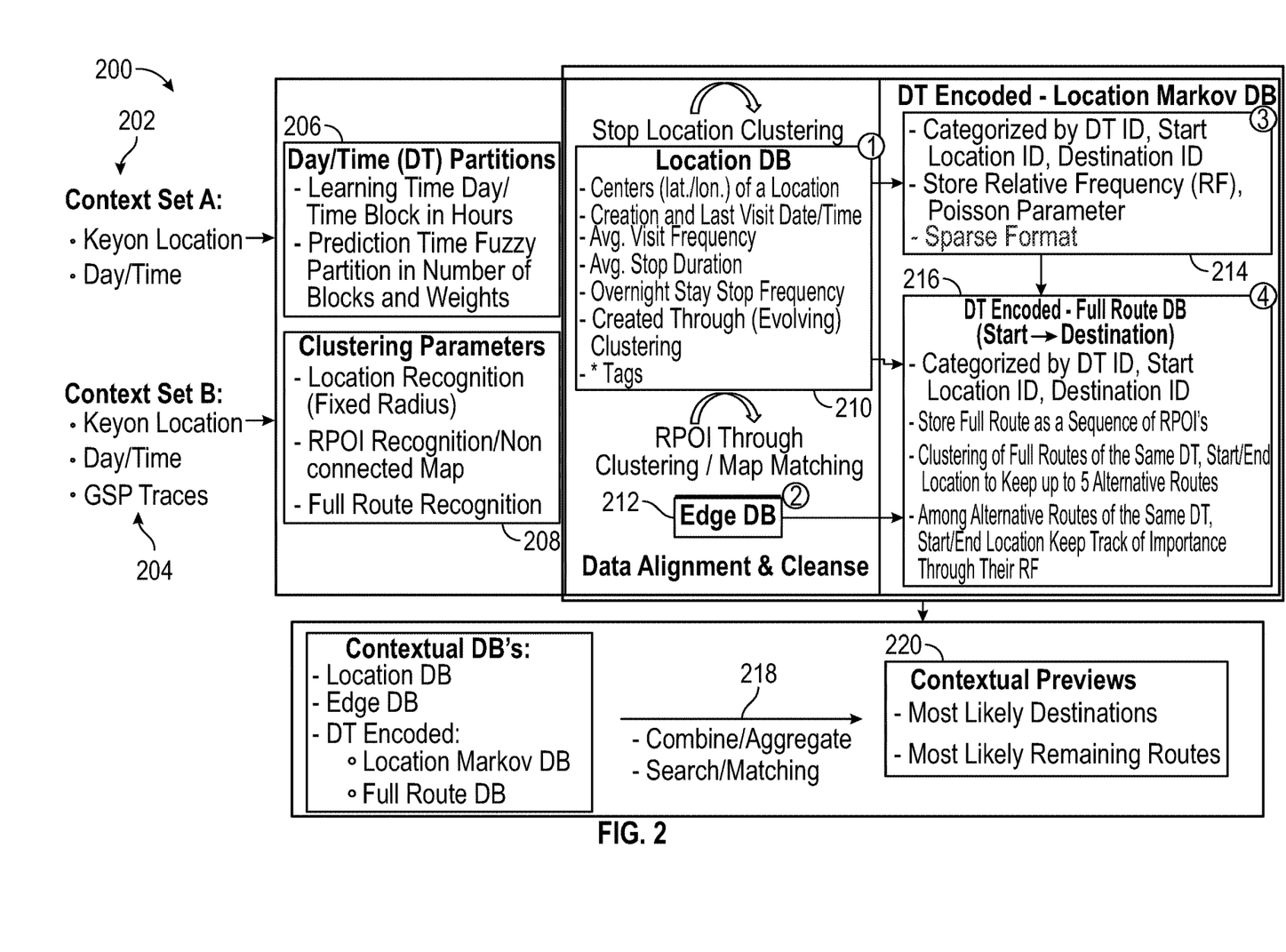
FIG. 2 illustrates another example flow diagram, in accordance with one or more embodiments of the disclosure.

FIG. 2 illustrates another example flow diagram 200, in accordance with one or more embodiments of the disclosure. The flow diagram 200 may provide a high-level depiction of the generation of the databases that are used in association with the prediction models described herein.

The flow diagram 200 may begin with operation 202 and operation 204, which may involve obtaining different context data sets. For example, operation 202 may involve obtaining a first context data set that may include a key-on location (a location at which a vehicle was turned on) and/or a day and time. Operation 204 may involve obtaining a second context data set that may include a second key-on location, a day and time, and GPS traces. These context data sets are merely exemplary, and any other number of data sets may be obtained including any other types of data as well.

From operations 202 and 204, the flow diagram 200 proceeds to operations 206 and 208. Operation 206 may involve producing day and time partitions. This may involve learning day and time blocks (for example, hour blocks, or any other amount of time). This may also involve the prediction of time fuzzy partitions in a number of blocks and weights. Start with predefined day and/or time partitions (for example, 6 hour blocks). In the background, alternative partitions can be in place using the same procedure (for example, 12 hour and 3 hour blocks). When one of the alternatives is producing better results by at least some predefined margin, the default partition size may be moved to the middle of either [3, 6] or [6, 12] hours blocks and the alternative smaller and/or larger hour blocks may be re-computed. If both larger and smaller hour blocks provide similar performance gain, larger hour blocks may be used because larger hour blocks may be better than an overall smaller number of total hour blocks. Operation 208 may involve clustering parameters. This may involve location recognition, RPOI (for example, a collection of road segments) recognition, and/or full-route recognition, for example.

Following operations 206 and 208, the flow diagram 200 proceeds to operations 210 and 212. Operations 210 and 212 may involve the creation and/or updating of one or more databases. For example, operation 210 may involve the creation and/or updating of a location database. The location database may include, for example, location information, a last visit date and time data, average visit frequency, average stop duration, overnight stay frequency, and/or any other types of data. This may be created through evolving clustering.

Following operations 210 and 212, the flow diagram 200 proceeds to operations 214 and 216. Operations 214 and 216 may involve the creation and/or updating of one or more Markov databases. These databases, in some cases, may be created and/or updated by encoding the data included in the location and edge databases. For example, operation 214 may involve a location Markov database. The location Markov database may be categorized by day and time identifiers and destination identifiers. The location Markov database may also store relative frequency and Poisson parameters. The location Markov database may also be in a sparse format. Operation 216 may involve a full route database (for example, starting point to destination). The full route database may be categorized by day and time identifiers, start location identifiers, and destination identifiers. The full route database may store full routes as a sequence of RPOIs. The full route database may involve clustering of full routes of the same day and time and start and end location to keep up to a certain number of alternative routes. Among alternative routes of the same day and time and start and end points, importance may be tracked through their frequency of use.

As indicated above, the operations through operation 216 may result in contextual databases including at least a location database, an edge database, and a day and time encoded location Markov database and a day and time encoded full route database.

Following operations 214 and 216, the flow diagram 200 proceeds to operation 218. Operation 218 may involve combining and aggregating, as well as searching and matching. Finally, the flow diagram 200 proceeds to operation 220. Operation 220 may involve providing contextual previews, which may include most likely destinations and/or most likely remaining routes.

In some embodiments, the prediction strategies associated with operation 218 may involve at least the following alternatives. One approach may be to predict from a single Markov table from the match day and/or time block. A second approach may be to predict from a collection day/time blocks each has its own Markov table. When performing the second alternative, each day and/or time block's Markov table is searched for the column that matches the starting location. Located multiple columns (the column match the starting location from neighbor day/time blocks) may be combined. A weighted sum with fuzzy (how close are the neighbors to the matching day/time block) may be produced, or an average may be determined. If the location is unknown, for each Markov table, all the columns may be aggregated into one column. This can be an average or use the weights from each column's max. The column from each neighbor may be combined into one single column.

Figure 3:
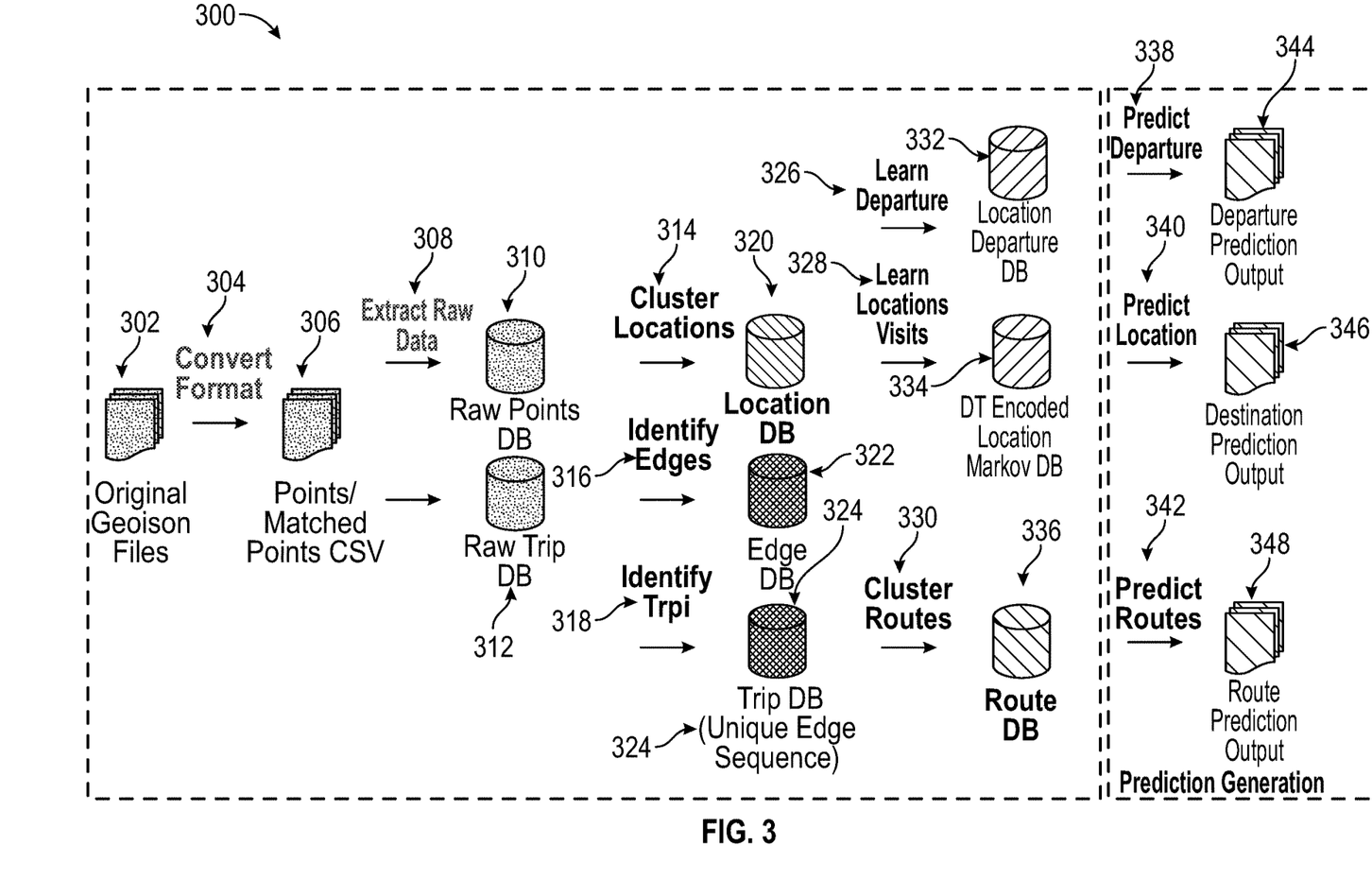
FIG. 3 illustrates another example flow diagram, in accordance with one or more embodiments of the disclosure.

FIG. 3 illustrates another example flow diagram 300, in accordance with one or more embodiments of the disclosure. The flow diagram 300 may provide a high-level overview of the flow of data that is used to perform the predictions described herein. The flow diagram 300 may begin by receiving raw data 302. In some embodiments, the raw 302 data may be in a geojson format. However, the raw data 302 may also be received in any other format as well. Once the raw data 302 is received, operation 304 of the flow diagram 300 involves converting the raw data 302 into a different format. For example, the raw data 302 may be converted into converted data 306 (for example, points/matched points csv data). In some cases, based on the format of the raw data 302, the conversion may not necessarily be necessary.

Once the raw data 302 is converted, the flow diagram 300 proceeds to operation 308, which involves extracting the data (for example, raw data 302 and/or converted data 306) to create and/or update one or more databases (for example, a raw points database 310 and/or a raw trip database 312).

Following operation 308, the flow diagram 300 proceeds to operations 314, 316, and 318. Operation 314 may involve clustering location data, operation 316 may involve identifying edge data, and operation 318 may involve identifying trips within the data. Operations 314, 316, and 318 may result in the creation and/or updating of a location database 320, an edge database 322, and/or a trip database 324.

In some embodiments, the raw data may include GPS traces. The raw points database 310 may be the starting and/or ending points (or the average of the first few and last few GPS points from the whole trip). The raw points database 310 may be the historical data of starting and ending points of a trip with time stamps. The raw trip database 312 may be the database for the same purpose, but for the whole GPS trace. The location database 320 may include the frequently visited locations identified through a cluster algorithm (each cluster with a centroid and a radius, visit frequency, creation and/or last visit date, a unique location identifier is assigned). The edge database 322 may be similar to the location database 320 but may also include only edges or road segments. This may be identified through also clustering or predefined by a map provider. The trip database 324 may include full routes expressed as a sequence of edge identifiers as defined in the edge database 322 in the exact sequence as it was traversed in the real-world. Each full route may be associated with a day and/or time block, starting and/or ending location identifier in the location database 320. Frequent routes (for a specific day/time block for a specific starting and/or ending location combination) may be identified through route clustering so we only record a new full route only if it is "at least" a certain level different from the ones already in the database. This means the prototypical full routes may be kept for different starting and/or ending locations, day and/or time blocks and keep track of them. When a destination is predicted, this database may be accessed to retrieve the matching full route(s) as predictions.

Following operations 314, 316, and 318, the flow diagram 300 proceeds to operations 326, 328, and 330. Operation 326 may involve learning departure times and/or locations for the user, operation 328 may involve learning location visits for the user, and operation 330 may involve clustering routes taken by the user. Operations 326, 328, and 330 may result in the creation and/or updating of a location departure database 332, a day and time encoded location Markov database 334, and/or a route database 336.

Following operations 326, 328, and 330, the flow diagram 300 may proceed to operations 338, 340, and 342. Operation 338 may involve predicting departure locations and/or times for the user, operation 340 may involve predicting locations for the user, and operation 342 may involve predicting routes for the user. Operations 338, 340, and 342 may result in outputs 344, 346, and 348. Output 344 may include one or more departure prediction outputs, output 346 may include one or more destination prediction outputs, and output 348 may include one or more route prediction outputs.

Figure 4:
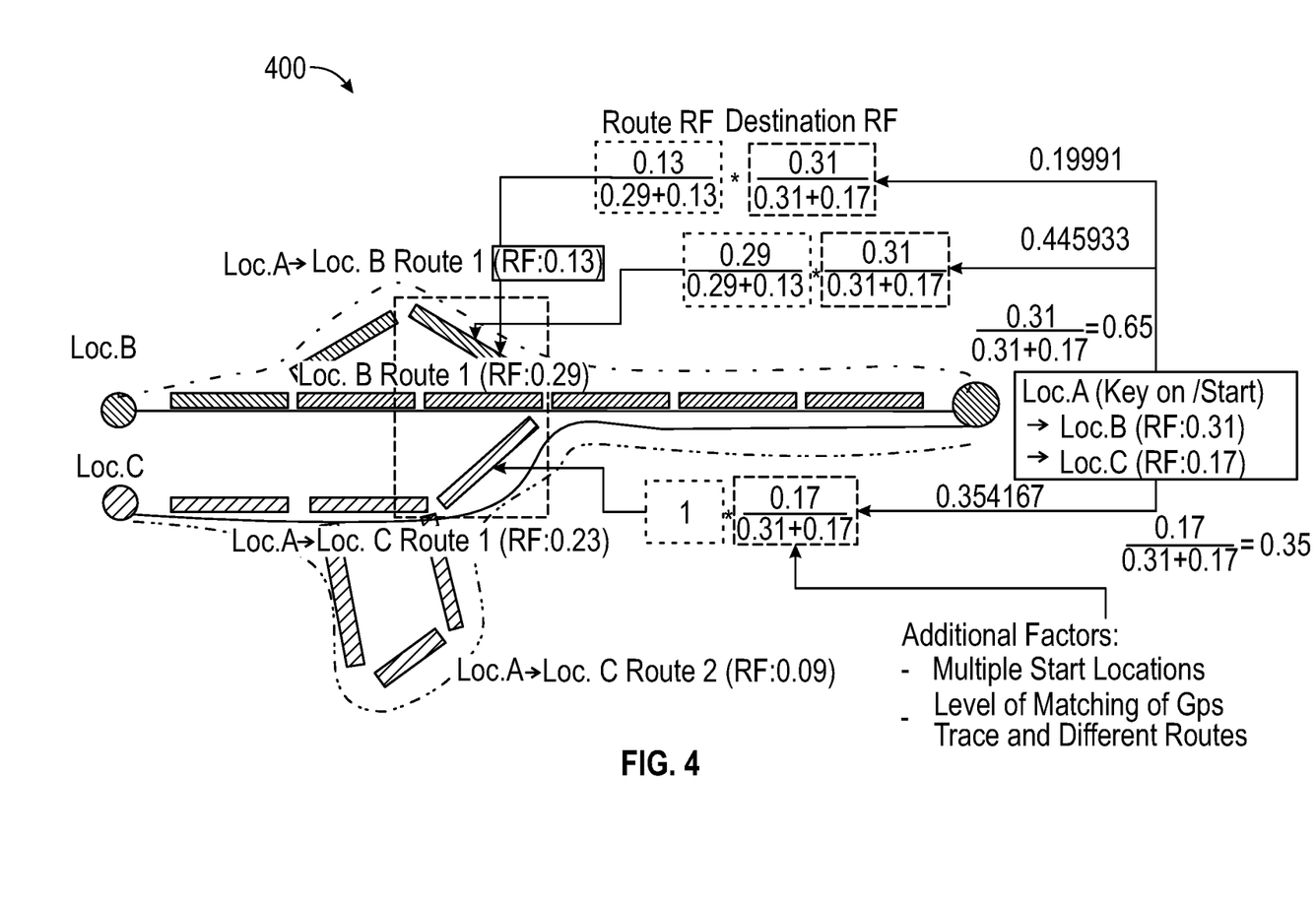
FIG. 4 illustrates an example personal contextual map, in accordance with one or more embodiments of the disclosure.

FIG. 4 illustrates an example personal contextual map 400, in accordance with one or more embodiments of the disclosure. The figure illustrates how destination to route prediction produces full routes and how to predict the probability of the next segments. The probable next segment may include segments that the user may have traversed in the past given the same contexts (day and/or time, start location, etc.) All other segments that are not part of this grouping may be neglected. For each next segment, the likelihood of being traveling by the user next may be determined as the product of the following. The probability of the associated destination and/or the probability of taking the road segment given the starting location and the predicted destination.

In some cases, there may be a segment that is common for multiple predicted destinations In such cases, the sum of the product for different destinations that segment may be performed. Additionally, at some point, (say 15 miles into the drive, for example), if none of the predictions of destination is more than a threshold percentage, then the system may automatically expand the day and/or time neighborhood to obtain more full routes to compare with the GPS trace of the current drive. First, use the expanded neighborhood to obtain an aggregated Markov table. Use the column related to the starting location to predict destinations, use the top destinations to get a pool of likely routes. If the prior search still not producing a satisfying result, the predictions of destinations may no longer be used to pull out relevant full routes. At this point, the top full routes may be used irrespective of the starting location. At this point, the most matched route(s) ending points may become the likely destinations. At this step, the starting location as an input to predicting destination and routes has been de-emphasized and/or removed. This may be performed purely from route matching, for example.

Figure 5:
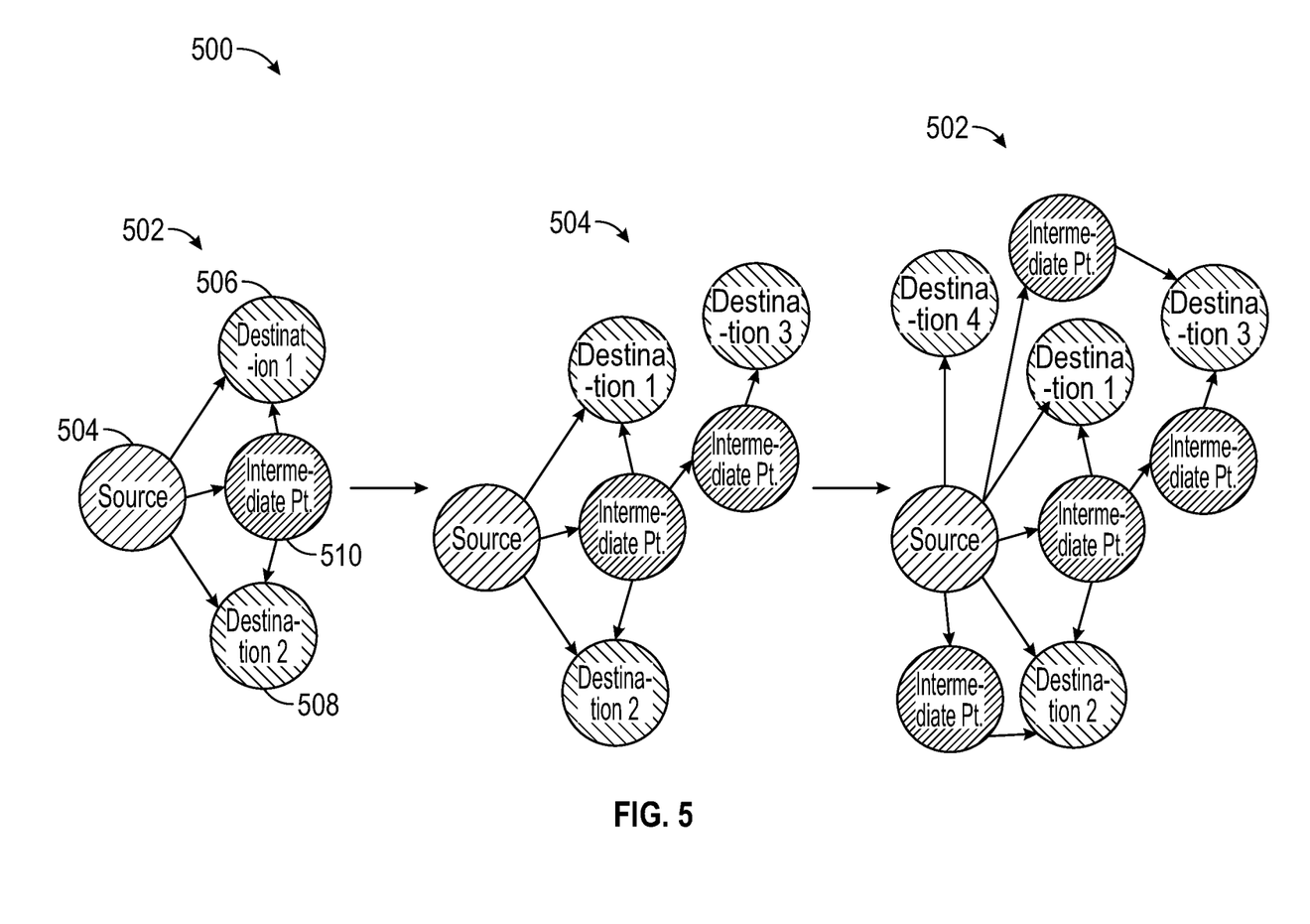
FIG. 5 illustrates an example graphical representation, in accordance with one or more embodiments of the disclosure.

FIG. 5 illustrates an example graphical representation 500, in accordance with one or more embodiments of the disclosure. A graphical knowledge base provides visualizations of produced route data. For example, a first graphical representation 502 shows a source location 504, a first destination 506, a second destination 508, and an intermediate point 510 for a user. A graphical knowledge base can be used to provide destination recommendations based on location type, user type, etc. The graphical knowledge base may also provide route recommendations using graph traversal algorithms. Additionally, the graphical knowledge base provides visually appealing interface to demonstrate to users their route and destinations. Machine learning models like K-NN clustering can be trained on graph embeddings.

The graphical knowledge base allows a constantly evolving view of a user's trips. This allows usage of the previously mentioned evolving ML algorithm for route or destination clustering. For example, the first graphical representation 502 may visualize data relating to a user at a first time, a second graphical representation 504 may visualize data relating to the user at a second time, and the third graphical representation 506 may visualize data relating to the user at a third time. As illustrated in the figure, the second graphical representation 504 and third graphical representation 506 depict an increasing number of destinations and intermediate points, as the user takes more trips over time.

Figure 6:
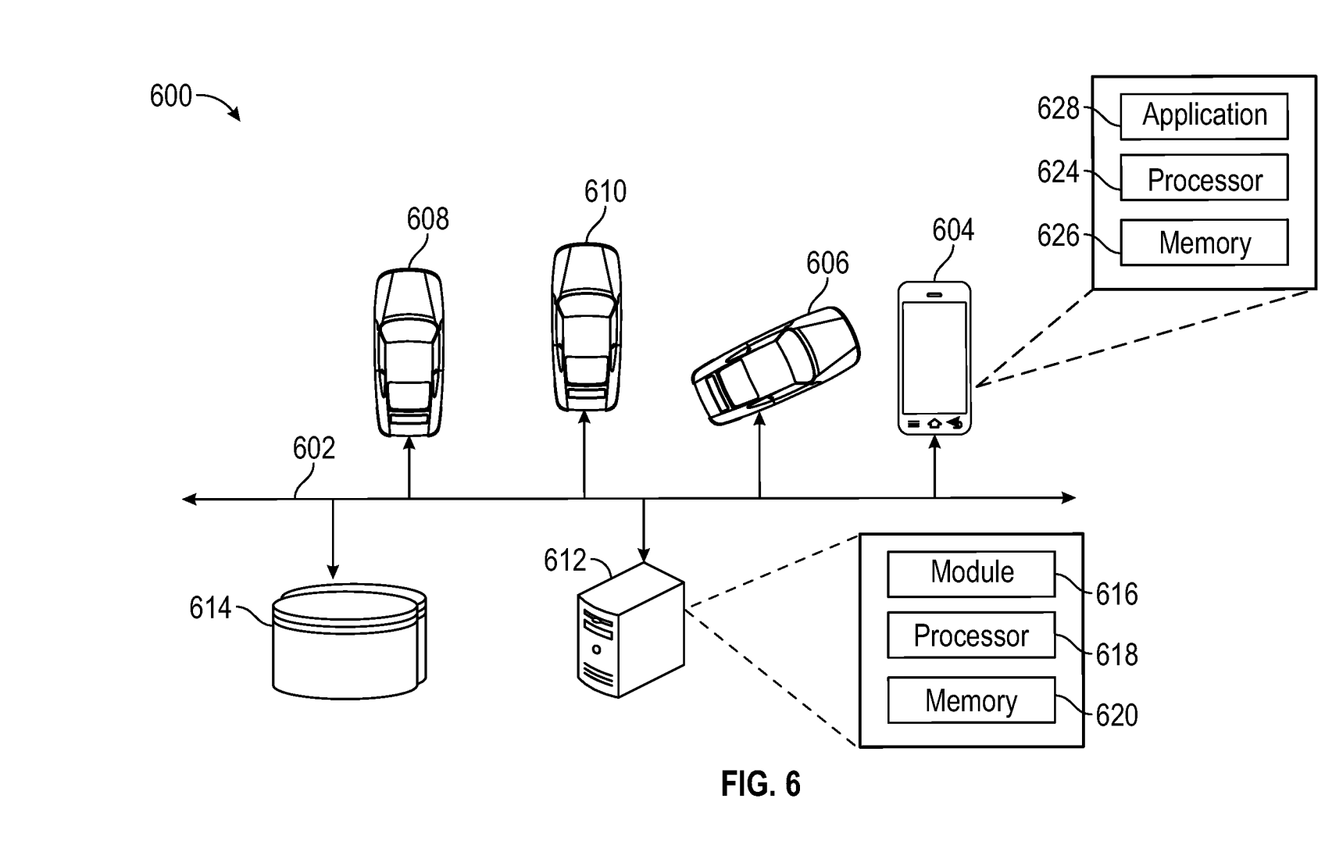
FIG. 6 illustrates an example system, in accordance with one or more embodiments of the disclosure.

FIG. 6 illustrates an example system 600, in accordance with one or more embodiments of the disclosure. In some embodiments, an example system 600 may include one or more vehicles (for example, vehicle 606, vehicle 608, and/or vehicle 610, as well as any other number of vehicles), one or more remote servers 612, one or more databases 614, and one or more mobile devices 604, which may be associated with one or more users (not depicted in the figure). The system 600 is merely exemplary, and a system as described herein may also include any other elements as well.

In some embodiments, the one or more vehicles may be vehicles operated by one or more users for which the route prediction may be performed herein. As aforementioned, the route prediction may be user-specific. That is, the system 600 depicts three different vehicles, and each vehicle may be associated with a different user. Thus, different predictions may be performed for each vehicle and each user because the typical starting locations, destination locations, and/or routes taken by each user may be different (as well as the timing of the routes). Additionally, in some cases, a single vehicle may be associated with multiple users. Predictions may also be performed for those multiple users that may use a single vehicle. That is, the predictions made herein may not necessarily be limited to one set of predictions per vehicle, but may rather be based on individual users associated with a single vehicle as well. In this manner, it may be determined (or predicted) which user is using the vehicle at a given time, and based on this, the predictions may be adjusted to match that particular user.

In some embodiments, a mobile device 604 may be a device (such as a smartphone, laptop computer, desktop computer, etc.) associated with a user that may also be used to present any visual information described herein (for example, the graphical representations).

A remote server 612 may be a system on which any of the analysis associated with presenting and managing offers to the one or more vehicles may be performed. In some cases, however, the processing may be performed locally at the one or more vehicles and/or the mobile device 604, or the processing may be split between the remote server 612 and the one or more vehicles and/or mobile device 604.

The one or more databases 614 may represent any of the databases that may store any of the data described herein. For example, the one or more databases may represent the one or more location databases, one or more edge databases, one or more day and time encoded location Markov databases, one or more full route databases, and/or any other databases described herein or otherwise.

Figure 7:
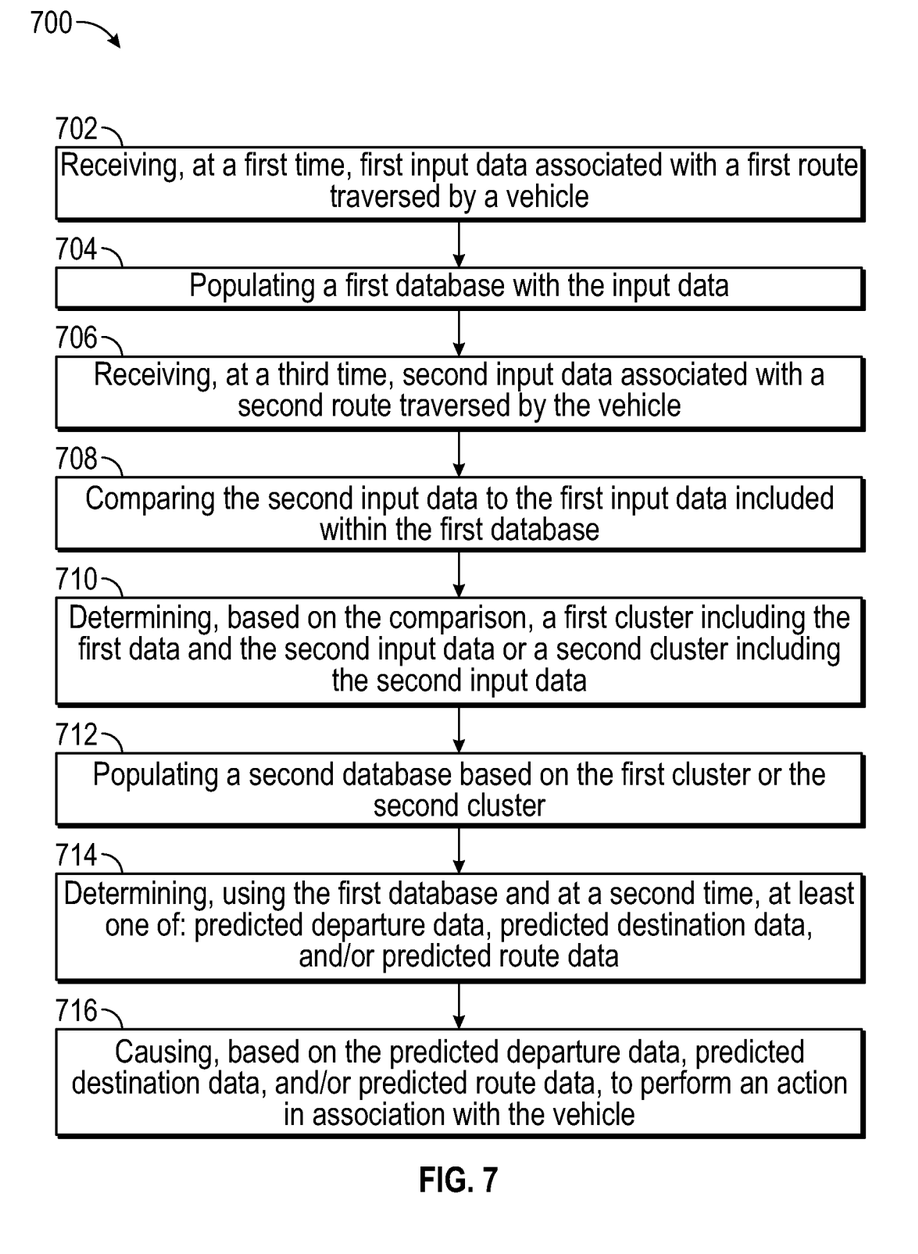
FIG. 7 illustrates an example method, in accordance with one or more embodiments of the disclosure.

FIG. 6 illustrates an example method 600, in accordance with one or more embodiments of this disclosure. At block 602, the method 600 may include receiving, at a first time, first input data associated with a first route traversed by a vehicle. At block 604, the method 600 may include populating a first database with the input data. At block 606, the method 600 may include receiving, at a third time, second input data associated with a second route traversed by the vehicle. At block 608, the method 600 may include comparing the second input data to the first input data included within the first database. At block 610, the method 600 may include determining, based on the comparison, a first cluster including the first data and the second input data or a second cluster including the second input data. At block 612, the method 600 may include populating a second database based on the first cluster or the second cluster. At block 614, the method 600 may include determining, using the first database and at a second time, at least one of: predicted departure data, predicted destination data, and/or predicted route data. At block 616, the method 600 may include causing, based on the predicted departure data, predicted destination data, and/or predicted route data, to perform an action in association with the vehicle.

Figure 8:
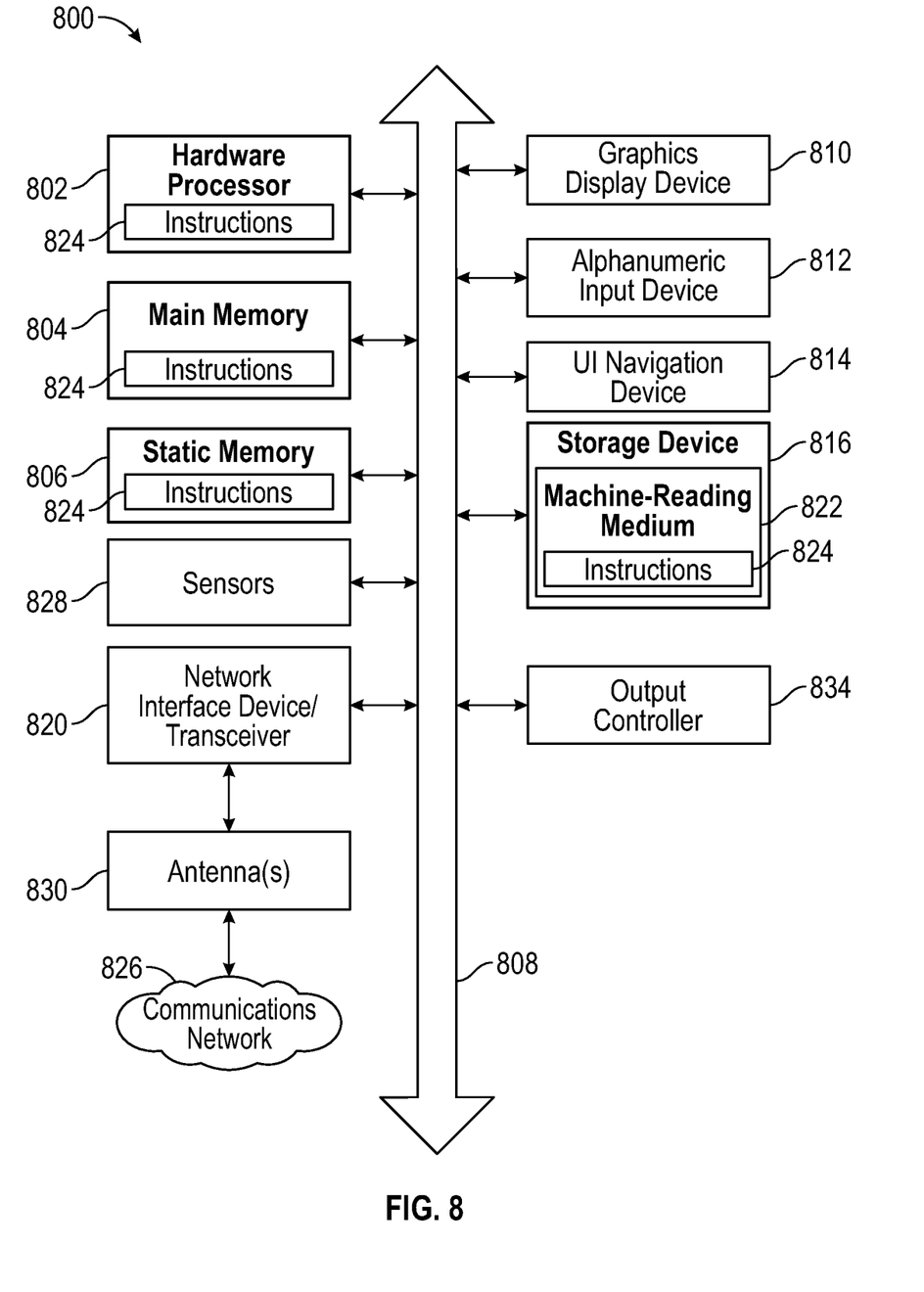
FIG. 8 illustrates an example of a computing system, in accordance with one or more embodiments of this disclosure.

FIG. 8 depicts a block diagram of an example machine 800 upon which any of one or more techniques (e.g., methods) may be performed, in accordance with one or more example embodiments of the present disclosure. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A system comprising:
   a processor; and
   a memory storing computer-executable instructions, that when executed by the processor, cause the processor to:
   receive, at a first time, first input data associated with a first route traversed by a vehicle;
   populate a first database with the input data;
   receive, at a third time, second input data associated with a second route traversed by the vehicle;
   compare the second input data to the first input data included within the first database;
   determine, based on the comparison, a first cluster including the first data and the second input data or a second cluster including the second input data;
   populate a second database based on the first cluster or the second cluster;
   determine, using the first database and at a second time, at least one of: predicted departure data, predicted destination data, and/or predicted route data; and
   cause, based on the predicted departure data, predicted destination data, and/or predicted route data, to perform an action in association with the vehicle,
   wherein determining the predicted departure data, predicted destination data, and/or predicted route data is based on a first type of prediction and a second type of prediction, the first type of prediction being based on a relative frequency and the second type of prediction being based on a Poisson parameter, and
   wherein determining the predicted departure data, predicted destination data, and/or predicted route data further comprises:
   determining a first probability based on the first type of prediction and a second probability based on the second type of prediction;
   determining a first weighted sum of the first probability and a second weighted sum of the second probability; and
   determining a third probability based on a combination of the first probability and the second probability.

2. The system of claim 1, wherein the action includes at least one of: automatically updating a navigation system of the vehicle to a predicted route, adjusting a physical component of the vehicle, and/or automatically conditioning a cabin of the vehicle.

3. The system of claim 2, further comprising a third database and a fourth database, wherein the first database is a location database, the third database is an edge database, the second database is a day and time encoded Markov database, and the fourth database is a day and time encoded full route database, wherein the second database and fourth database are based on the first database and third database.

4. The system of claim 1, wherein the computer-executable instructions further cause the processor to generate a contextual map based on the predicted departure data, predicted destination data, and/or predicted route data.

5. The system of claim 1, wherein determining the predicted departure data, predicted destination data, and/or predicted route data is further based on a machine learning model.

6. A method comprising:
   receiving, at a first time, first input data associated with a first route traversed by a vehicle;
   populating a first database with the input data;
   receiving, at a third time, second input data associated with a second route traversed by the vehicle;
   comparing the second input data to the first input data included within the first database;
   determining, based on the comparison, a first cluster including the first data and the second input data or a second cluster including the second input data;
   populating a second database based on the first cluster or the second cluster;
   determining, using the first database and at a second time, at least one of: predicted departure data, predicted destination data, and/or predicted route data; and
   causing, based on the predicted departure data, predicted destination data, and/or predicted route data, to perform an action in association with the vehicle,
   wherein determining the predicted departure data, predicted destination data, and/or predicted route data is based on a first type of prediction and a second type of prediction, the first type of prediction being based on a relative frequency and the second type of prediction being based on a Poisson parameter, and wherein determining the predicted departure data, predicted destination data, and/or predicted route data further comprises:
   determining a first probability based on the first type of prediction and a second probability based on the second type of prediction;
   determining a first weighted sum of the first probability and a second weighted sum of the second probability; and
   determining a third probability based on a combination of the first probability and the second probability.

7. The method of claim 6, wherein the action includes at least one of: automatically updating a navigation system of the vehicle to a predicted route, adjusting a physical component of the vehicle, and/or automatically conditioning a cabin of the vehicle.

8. The method of claim 7, further comprising a third database and a fourth database, wherein the first database is a location database, the third database is an edge database, the second database is a day and time encoded Markov database, and the fourth database is a day and time encoded full route database, wherein the second database and fourth database are based on the first database and third database.

9. The method of claim 6, further comprising generating a contextual map based on the predicted departure data, predicted destination data, and/or predicted route data.

10. The method of claim 6, wherein determining the predicted departure data, predicted destination data, and/or predicted route data is further based on a machine learning model.

11. A non-transitory computer-readable medium storing computer-executable instructions, that when executed by a processor, cause the processor to perform operations of:
   receiving, at a first time, first input data associated with a first route traversed by a vehicle;
   populating a first database with the input data;
   receiving, at a third time, second input data associated with a second route traversed by the vehicle;
   comparing the second input data to the first input data included within the first database;
   determining, based on the comparison, a first cluster including the first data and the second input data or a second cluster including the second input data;
   populating a second database based on the first cluster or the second cluster;
   determining, using the first database and at a second time, at least one of: predicted departure data, predicted destination data, and/or predicted route data; and
   causing, based on the predicted departure data, predicted destination data, and/or predicted route data, to perform an action in association with the vehicle,
   wherein determining the predicted departure data, predicted destination data, and/or predicted route data is based on a first type of prediction and a second type of prediction, the first type of prediction being based on a relative frequency and the second type of prediction being based on a Poisson parameter, and
   wherein determining the predicted departure data, predicted destination data, and/or predicted route data further comprises:
      determining a first probability based on the first type of prediction and a second probability based on the second type of prediction;
      determining a first weighted sum of the first probability and a second weighted sum of the second probability; and
      determining a third probability based on a combination of the first probability and the second probability.

12. The non-transitory computer-readable medium of claim 11, wherein the action includes at least one of: automatically updating a navigation system of the vehicle to a predicted route, adjusting a physical component of the vehicle, and/or automatically conditioning a cabin of the vehicle.

13. The non-transitory computer-readable medium of claim 12, further comprising a third database and a fourth database, wherein the first database is a location database, the third database is an edge database, the second database is a day and time encoded Markov database, and the fourth database is a day and time encoded full route database, wherein the second database and fourth database are based on the first database and third database.

14. The non-transitory computer-readable medium of claim 11, wherein the computer-executable instructions further cause the processor to generate a contextual map based on the predicted departure data, predicted destination data, and/or predicted route data.

* * * * *